United States Patent
Becker et al.

(10) Patent No.: US 7,958,014 B2
(45) Date of Patent: Jun. 7, 2011

(54) METHOD AND APPARATUS FOR BUILDING COMMERCIAL DISTRIBUTED COMPUTING NETWORKS VIA COMPUTER COST SUBSIDIZATION

(75) Inventors: Craig Henry Becker, Austin, TX (US); Robert Simon Goodman, Austin, TX (US); Stewart Earle Nickolas, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1558 days.

(21) Appl. No.: 10/867,252

(22) Filed: Jun. 14, 2004

(65) Prior Publication Data

US 2004/0230501 A1 Nov. 18, 2004

Related U.S. Application Data

(62) Division of application No. 09/852,754, filed on May 10, 2001, now abandoned.

(51) Int. Cl.
*G06Q 30/00* (2006.01)
(52) U.S. Cl. ...... 705/26.1; 705/27.1; 709/201; 709/223; 709/224
(58) Field of Classification Search ............ 705/26, 705/27; 709/201, 203, 226, 223, 224; 379/201.01; 718/106; 710/5
See application file for complete search history.

(56) References Cited

U.S. PATENT DOCUMENTS

| | | | | |
|---|---|---|---|---|
| 5,675,736 A | 10/1997 | Brady et al. | ............. | 395/200.03 |
| 5,692,197 A * | 11/1997 | Narad et al. | ................... | 713/323 |
| 5,761,507 A | 6/1998 | Govett | ......................... | 395/684 |
| 5,889,989 A | 3/1999 | Robertazzi et al. | ........... | 395/675 |
| 5,970,477 A | 10/1999 | Roden | ............................. | 705/32 |
| 6,003,065 A | 12/1999 | Yan et al. | ...................... | 709/201 |
| 6,009,455 A | 12/1999 | Doyle | .......................... | 709/201 |
| 6,397,244 B1 | 5/2002 | Morimoto et al. | ............ | 709/200 |

(Continued)

FOREIGN PATENT DOCUMENTS

JP 61256420 A * 11/1986

(Continued)

OTHER PUBLICATIONS

Press release, Dynamically Generated Insertion Ring Configuration Table for a Distributed Data Processing System ; IBM Technical Disclosure Bulletin; Apr. 1, 1989; vol. 31;Issue#11;p. #358-360;Cross Reference: 0018-8689-31-11-358.*

(Continued)

*Primary Examiner* — Yogesh C Garg
(74) *Attorney, Agent, or Firm* — Yee & Associates, P.C.; Jeffrey S. LaBaw

(57) ABSTRACT

A method and apparatus for distributed computing in a network data processing system. A task is accepted for distributed computing. Work units are sent to a plurality of data processing systems on a network, wherein each data processing system within the plurality of data processing systems includes a software for accepting a work unit, processing the work unit to generate a result, and returning the result, wherein the software is monitored for compliance with an operation policy requiring a connection to the network and allocating a period of time for processing work units. Results are received from the plurality of data processing systems. These data processing systems may be individually owned by consumers in which the systems are provided at no cost or some lower cost in return for making available processing resources for processing work units.

18 Claims, 5 Drawing Sheets

U.S. PATENT DOCUMENTS

| | | | | |
|---|---|---|---|---|
| 6,477,221 | B1 | 11/2002 | Ning | 378/4 |
| 6,718,384 | B2* | 4/2004 | Linzy | 709/224 |
| 6,724,875 | B1* | 4/2004 | Adams et al. | 379/201.01 |
| 6,728,947 | B1 | 4/2004 | Bengston | 717/103 |
| 6,732,139 | B1 | 5/2004 | Dillengerger et al. | 709/102 |
| 6,847,995 | B1* | 1/2005 | Hubbard et al. | 709/223 |
| 7,051,330 | B1* | 5/2006 | Kaler et al. | 718/106 |
| 7,349,348 | B1* | 3/2008 | Johnson et al. | 370/254 |
| 2001/0039575 | A1* | 11/2001 | Freund et al. | 709/223 |
| 2004/0163095 | A1 | 8/2004 | Hara et al. | 718/105 |

FOREIGN PATENT DOCUMENTS

JP    411338834 A    12/1999

OTHER PUBLICATIONS

Nelson et al., "Performance Analysis of Parallel Processing Systems", Article View, Apr. 1988, vol. 14, Iss. 4, http://proquest.umi.com/pqdweb?index=12&did=000000001142653&SrchMode=1&sid=12&..., p. 1 of 1.

* cited by examiner

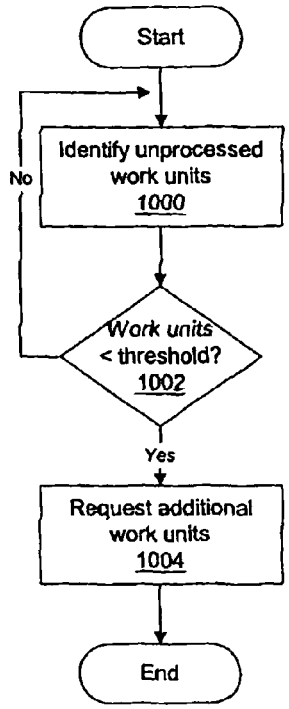
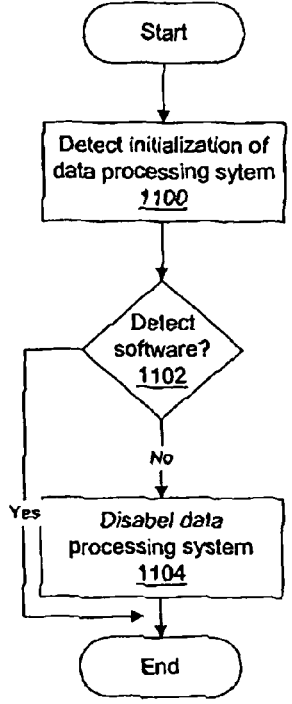
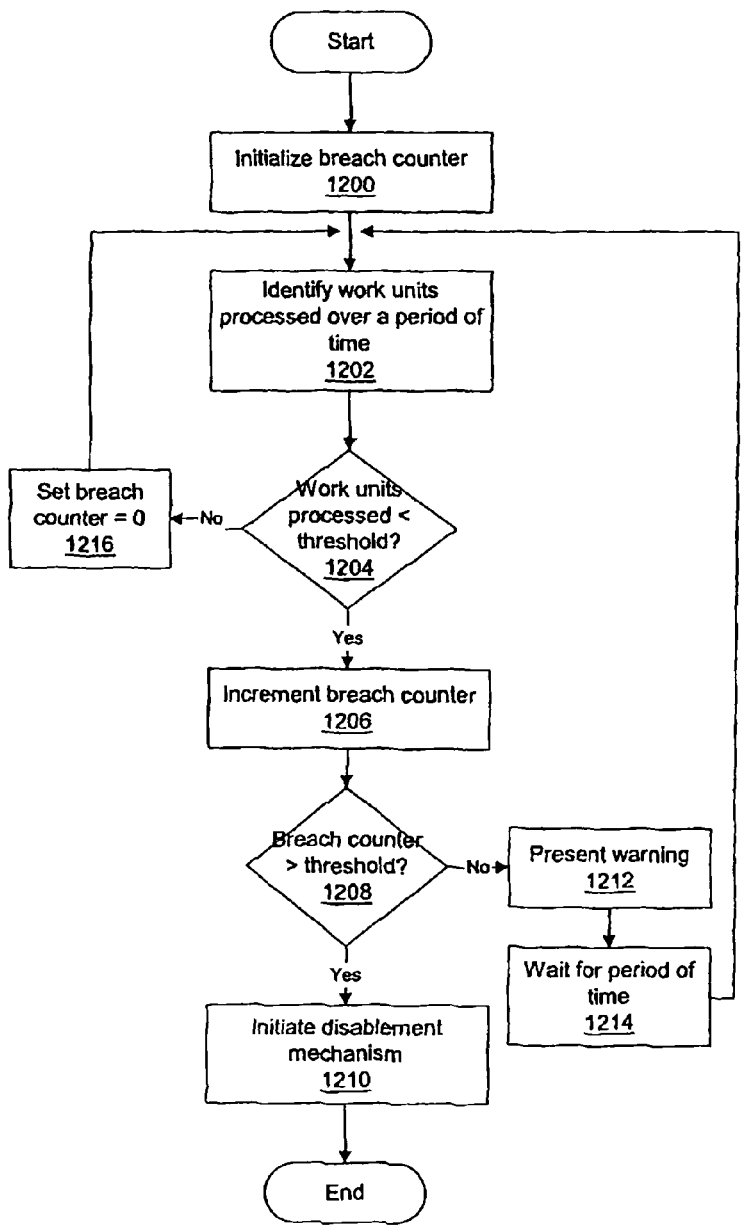

METHOD AND APPARATUS FOR BUILDING COMMERCIAL DISTRIBUTED COMPUTING NETWORKS VIA COMPUTER COST SUBSIDIZATION

This application is a divisional of application Ser. No. 09/852,754, filed May 10, 2001, now abandoned, which is herein incorporated by reference.

BACKGROUND OF THE INVENTION

1. Technical Field

The present invention relates generally to an improved data processing system, and in particular to a method and apparatus for processing data. Still more particularly, the present invention provides a method, apparatus, and computer implemented instructions for distributed computation using subsidized computer systems.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Additionally, many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions. With respect to commerce on the Web, individual consumers and business use the Web to purchase various goods and services. In offering goods and services, some companies offer goods and services solely on the Web while others use the Web to extend their reach.

Another benefit made possible by the Internet is to enable processing of problems, which are intractable using modern day super computers. With the Internet, it is possible to take many of these "intractable" problems, divide them into small work units, and have each work unit process by one of hundreds, thousands, or even millions of network-connected computers.

Many large computation tasks can be decomposed into a number (sometimes a large number) of smaller computation tasks which, when their results are properly integrated, provide the solution to the overall task. SETI@home is a popular example of one such large task: a large amount of radio telescope-data is collected, and small snippets of the data are sent out to subscribing machines around the world. The data is processed, the results are returned to the central collection point, and eventually all of the data is processed. Other tasks that are easily decomposed and distributed in this manner are Monte Carlo simulations and computer graphics (for instance, ray tracing of complex scenes). A work unit is typically a collection of data and functions that operate on that data. For instance, using an Object-Oriented programming language such as Java, a work unit might be a Class or a set of Classes that contain a set of data, plus methods to process that data. When a work unit is completed at a computer, the computer returns the result. Then, the computer may receive another work unit for processing. The collection of computers providing this distributed computing function also is referred to as a distributed computing array.

In many cases, the requestor or customer for which the work units are being processed is charged for use of the distributed computing array. The ability to use a distributed computing array for a charge is desirable to a customer because the customer does not have to build or maintain a distributed computing array. Oftentimes, the customer may only have an occasional need for this type of computing power.

On the other hand, the provider of the distributed computing array is left with the burden of building and maintaining the distributed computing array. For example, real estate or space is required for housing the computers or work stations. Additionally, maintenance and power costs are present. The time and expense involved with building and maintaining the distributed computing array reduces the number of businesses or organizations that are able to provide these types of services.

In some cases, a business may obtain the use of computing time from owners of individual computers. In many cases, the use of computing time comes at a cost in which the owners request or require payment be made for the use. The management of this type of distributed computing array also may be prohibitive. For example, the work units processed are tracked for each computer owner and a check must be generated and sent to each individual. This may result in a requirement to track and send checks to thousands of individuals.

It would be advantageous to have a method and apparatus for providing a large distributed computing array to process the work unit elements of these large problems.

SUMMARY OF THE INVENTION

The present invention provides for a method and apparatus for distributed computing in a network data processing system. A task is accepted for distributed computing. Work units are sent to a plurality of data processing systems on a network, wherein each data processing system within the plurality of data processing systems includes a software for accepting a work unit, processing the work unit to generate a result, and returning the result, wherein the software is monitored for compliance with an operation policy requiring a connection to the network and allocating a period of time for processing work units. Results are received from the plurality of data processing systems. These data processing systems may be individually owned by consumers in which the systems are provided at no cost or some lower cost in return for making available processing resources for processing work units.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10 is a flowchart of a process used for monitoring work units in accordance with a preferred embodiment of the present invention;

FIG. 11 is a flowchart of a process used for enforcing a policy for running software to process work units in accordance with a preferred embodiment of the present invention; and FIG. 12 is a flowchart of a process used for enforcing a policy for processing work units in accordance with a preferred embodiment of the present invention.

DETAILED DESCRIPTION OF THE PREFERRED EMBODIMENT

Figure 1:
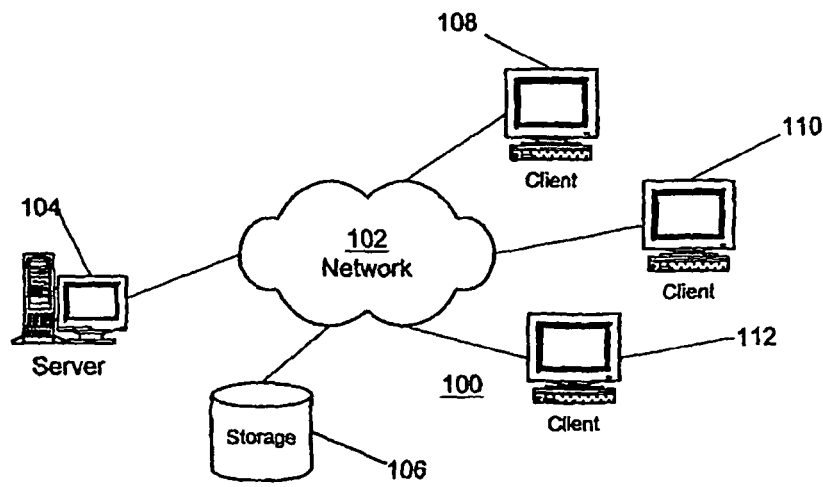
FIG. 1 is a pictorial representation of a network of data processing systems in which the present invention may be implemented.
Figure 1:
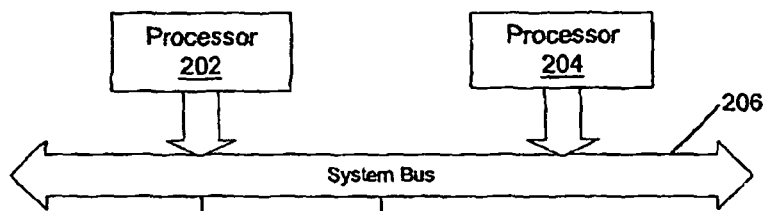

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
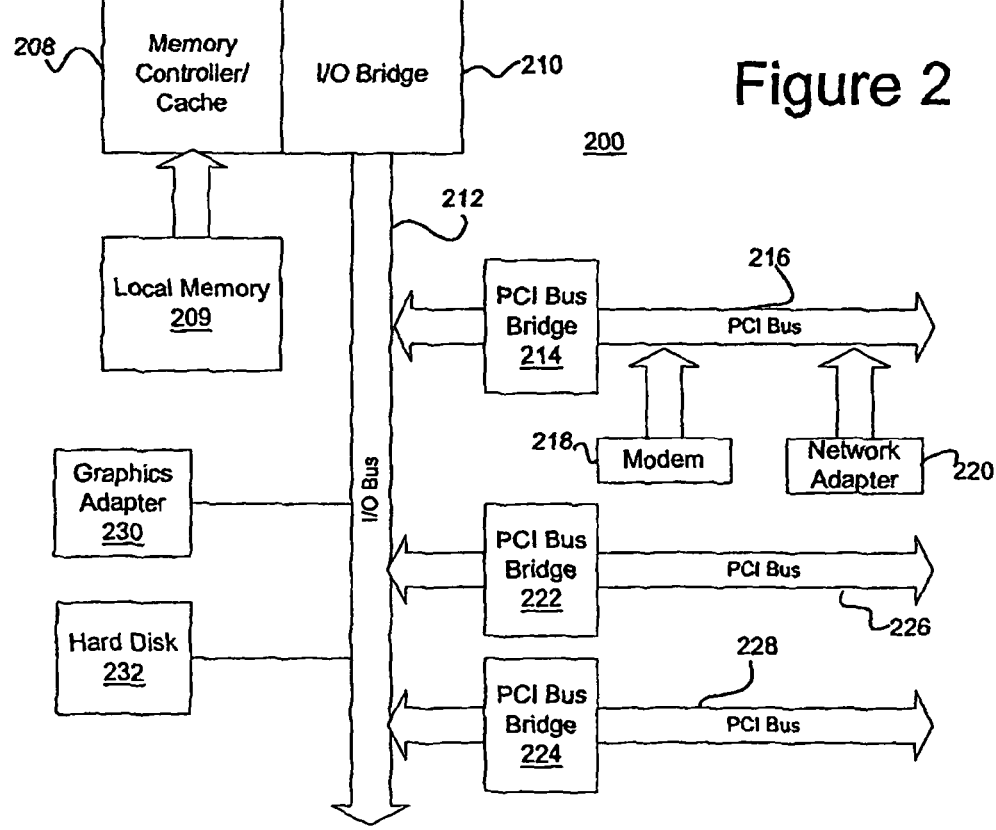
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
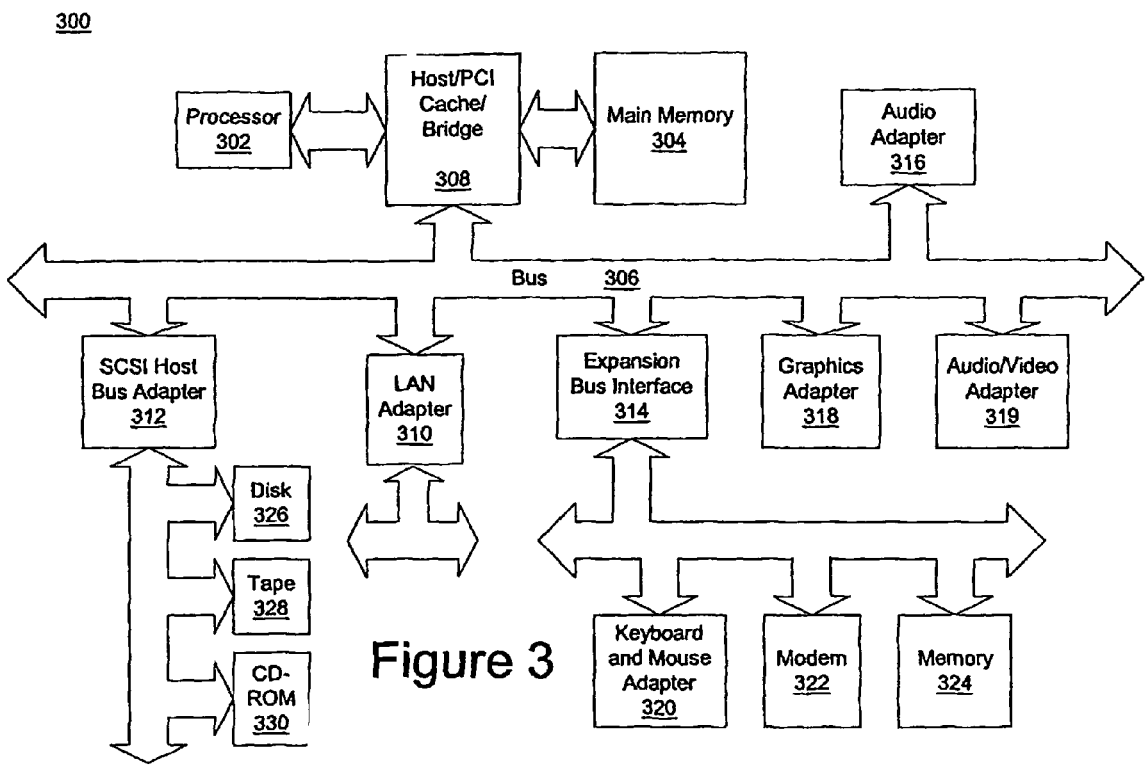
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
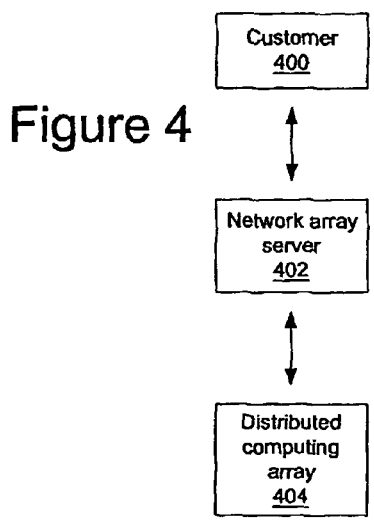
FIG. 4 is a diagram illustrating a distributed computing network in accordance with a preferred embodiment of the present invention.

Turning next to FIG. 4, a diagram illustrating a distributed computing network is depicted in accordance with a preferred embodiment of the present invention. In this example, customer 400 may send a request to network array server 402 to process a task. The task may be divided into work units by customer 400 or by network array server 402. Upon receiving the requests, the work units may be distributed to distributed computing array 404 for processing.

As results are generated from processing work requests, the results are returned from distributed computing array 404 to network array server 402. These results are returned to customer 400 with customer 400 being billed for the processing.

In the depicted examples, distributed computing array 404 is made up of many personal or home computers provided to users for no cost or a low cost. The cost for subsidizing these computers within distributed computing array 404 is recouped by charging customer 400 for processing the request. The computers are provided to the users under certain stipulations. For example, each computer within distributed computing array 404 includes software that accepts, processes, returns, and requests work units from the business source, which is network array server 402, in this example. Additionally, users may be required to have the computer powered on, have network access, and run this software for some minimum number of hours a day.

Although the users bear the cost of providing network access and power for the computers, they receive a benefit from being provided a computer at a low cost or at no cost. The business setting up the array bears the burden of the initial cost of establishing the array, but maintenance of the array is reduced because accounting and reimbursing individual users for processing resources is avoided. For example, keeping track of individual work units, and generating and sending thousands of checks is avoided. Further, space and electricity needed for the computers also is provided by the users.

Figure 5:
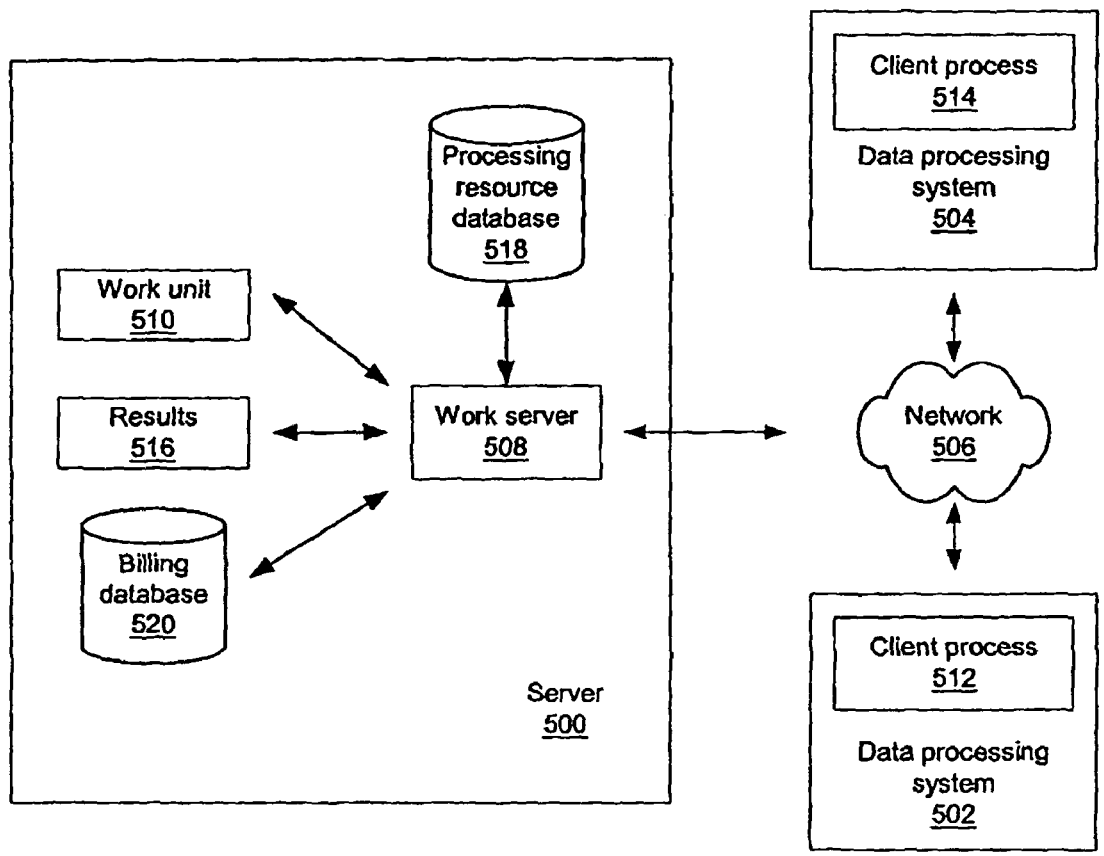
FIG. 5 is a diagram illustrating software components used in distributed computation in accordance with a preferred embodiment of the present invention.

Turning now to FIG. 5, a diagram illustrating software components used in distributed computation is depicted in accordance with a preferred embodiment of the present invention. In this example, server 500 receives and distributes work to data processing system 502 and data processing system 504 through network 506. This network may be, for example, a local area network (LAN), a wide area network (WAN), an intranet, the Internet, or some combination thereof. Server 500 may be implemented as network array server 402 in FIG. 4 using data processing system 200 in FIG. 2, while data processing systems 502 and 504 may be implemented as distributed computing array 404 in FIG. 4 using data processing system 300 in FIG. 3. Of course, a distributed computing array would have hundreds or thousands of computers.

Work server 508 is a software component used to send work unit 510 to client processes 512 and 514 executing on data processing systems 502 and 504, respectively. Client processes 512 and 514 each include processes used for receiving work units, processing work units, requesting work units, and returning of results. Results returned from client processes 512 and 514 are stored in results 516.

Processing resource database 518 is accessed by work server 508 to identify and assign work units to different data processing systems. A requester or other third party presenting the computational project may be billed using billing database 520. Billing may take various forms. For example, a customer may be billed for each work unit, for the job in its entirety, or on a flat monthly fee.

The various components depicted in FIGS. 1-5 are provided for purposes of illustration and are not intended to limit the architecture or components used in implementing invention.

Figure 6:
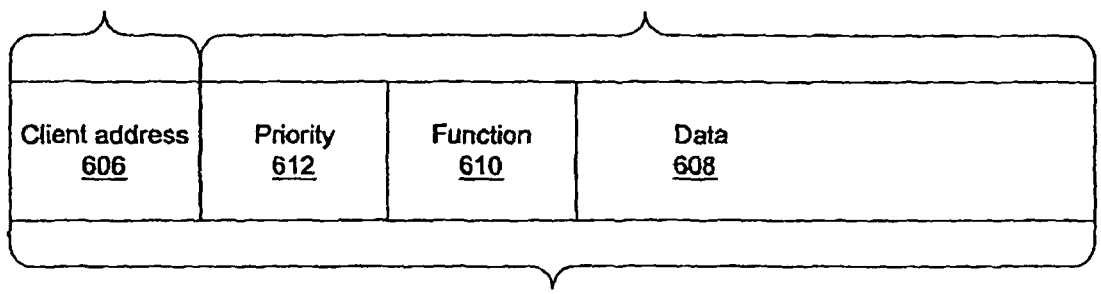
FIG. 6 is a diagram of a request in accordance with a preferred embodiment of the present invention.

Turning now to FIG. 6, a diagram of a request is depicted in accordance with a preferred embodiment of the present invention. In this example, request 600 includes header 602 and body 604. Header 602 contains client address 606 identifying the data processing system that is to process the work unit. In the depicted examples, a work unit is made up of data 608 and function 610. Function 610 is the functional process that is to be performed upon data 608. Priority 612 indicates a priority for the particular work unit and may be used to determine the order to which the work units are processed at a particular data processing system.

Figure 7:
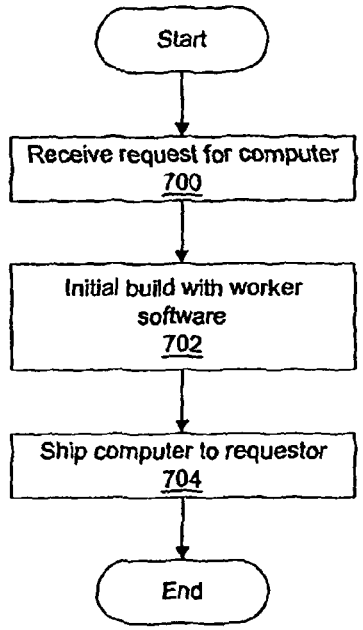
FIG. 7 is a flowchart of a process used for setting up a computer in a distributed computing array in accordance with a preferred embodiment of the present invention.

With reference now to FIG. 7, a flowchart of a process used for setting up a computer in a distributed computing array is depicted in accordance with a preferred embodiment of the present invention. The process illustrated in FIG. 7 may be implemented in a server, such as network array server 402 in FIG. 4. This process is used to receive and process requests for subsidized computers that are to be added to a distributed computing array, such as distributed computing array 404 in FIG. 4.

The process begins by receiving a request for a computer (step 700). This request may be received as a form filled out by a user in a Web page. Next, the building of a computer with worker software is initiated (step 702). Step 702 may be initiated by the generation of an order for the computer within the business setting up the distributed computing array or as an order to a third party vendor. Then, the computer is shipped to the requester (step 704) with the process terminating thereafter.

Figure 8:
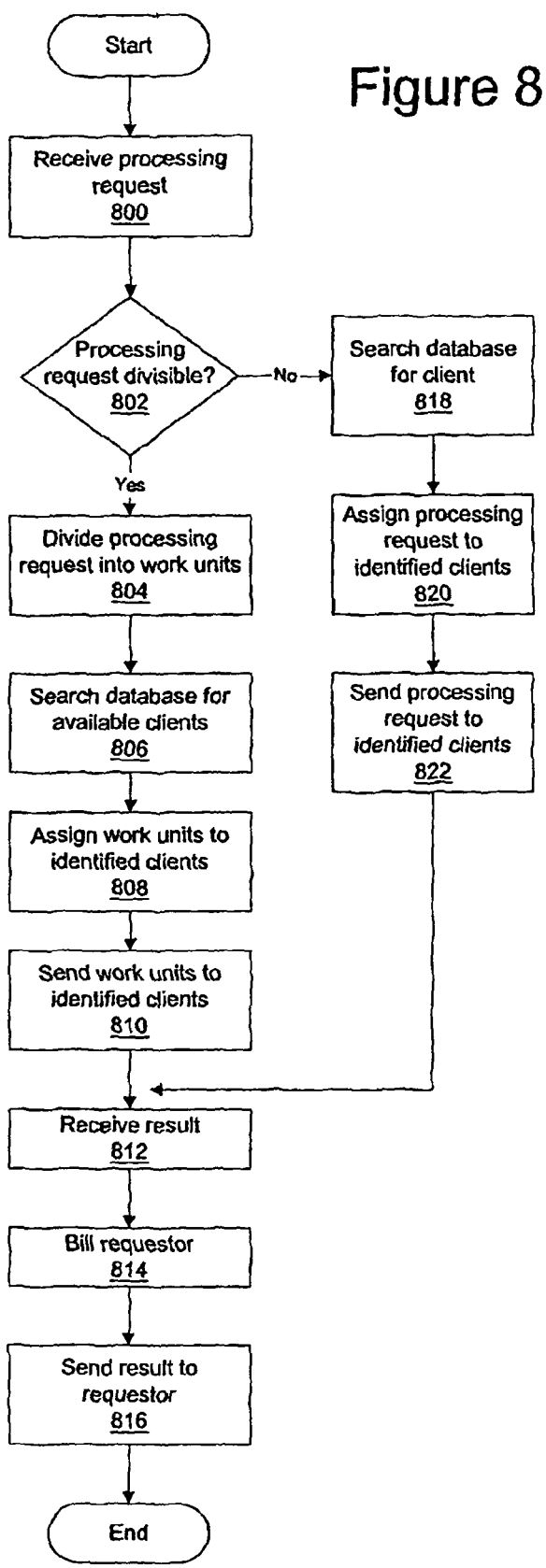
FIG. 8 is a flowchart of a process used for processing a task or request received from a customer in accordance with a preferred embodiment of the present invention.

Turning next to FIG. 8, a flowchart of a process used for processing a task or request received from a customer is depicted in accordance with a preferred embodiment of the present invention. The process illustrated in FIG. 8 may be implemented in a server, such as server 500 in FIG. 5.

The process begins by receiving a processing request from a customer (step 800). The request or task may already be divided into work units or may require division by the server. A determination is then made as to whether the processing request is divisible (step 802). If the request is already in the form of work units, then the request is not divisible. If the processing request is divisible, the processing request is divided into work units (step 804). The database is then searched for available clients within a distributed computing array (step 806). This search may be made by searching a database, such a processing resource database 518 in FIG. 5. Work units are assigned to clients identified by the search (step 808), and the work units are sent to those clients (step 810).

Next, results are received from the identified clients (step 812). The requestor is billed (step 814). The results are then sent to the requester (step 816) with the process terminating thereafter.

Turning back to step 802, if the processing request is not divisible, a database is searched for a client (step 818). In this case, the request already contains one or more work units ready for processing by a distributed computing array. The processing request is assigned to one or more identified clients (step 820), and that request is sent to these identified clients (step 822) with the process proceeding to step 812 as described above.

Figure 9:
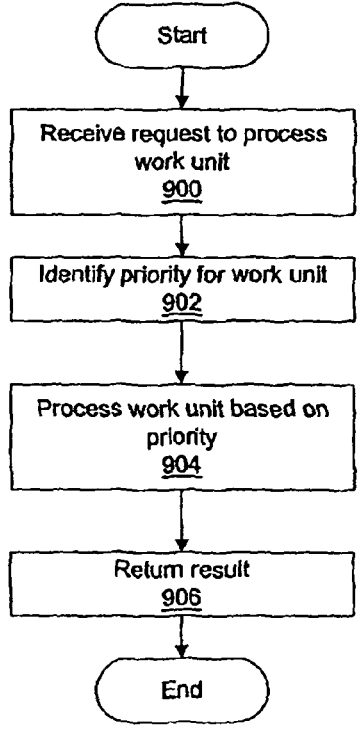
FIG. 9 is a flowchart of a process used for processing work units in accordance with a preferred embodiment of the present invention.

With reference now to FIG. 9, a flowchart of a process used for processing work units is depicted in accordance with a preferred embodiment of the present invention. The process illustrated in FIG. 9 may be implemented in client process, such as client process 512 or client process 514 in FIG. 5.

The process begins by receiving a request to process a work unit (step 900). Next, priority is identified for the work unit (step 902). The work unit is then processed based on priority (step 904). A result is returned to the requestor (step 906) with the process terminating thereafter.

Turning next to FIG. 10, a flowchart of a process used for monitoring work units is depicted in accordance with a preferred embodiment of the present invention. The process illustrated in FIG. 10 may be implemented in client process 512 or client process 514 in FIG. 5.

The process begins by identifying the number of unprocessed work units present in the data processing system (step 1000). A determination is made as to whether the identified work units are less than a threshold (step 1002). If the number of unprocessed work units is less than a threshold, additional work units are requested for processing by the data processing system (step 1004) with the process terminating thereafter. If the number is not less than a threshold, the process returns to step 1000.

With reference now to FIG. 11, a flowchart of a process used for enforcing a policy for running software to process work units is depicted in accordance with a preferred embodiment of the present invention. The process illustrated in FIG. 11 may be implemented in client process 512 or client process 514 in FIG. 5.

A policy is present in this process to ensure that the computer is powered, connected to the network, and running the software needed for processing work units. Failure to enforce the policy may result in the computer being repossessed. Further, software may be present to disable the computer until compliance with the policy occurs.

The process begins by detecting initialization of the data processing system (step 1100). Thereafter, a determination is made as to whether the software for processing work units is detected during initialization of the data processing system (step 1102). If the software is not detected, the data processing system is disabled (step 1104) with the process terminating thereafter. Otherwise, the process terminates with normal operation of the data processing system.

For example, power to the processing unit could be shut off if the software for processing work units is not detected when the system initializes.

Turning next to FIG. 12, a flowchart of a process used for enforcing a policy for processing work units is depicted in accordance with a preferred embodiment of the present invention. The process illustrated in FIG. 12 may be implemented either on a server managing the distribute computing array, such as server 500 in FIG. 5 or in a data processing system within the distributed computing array, such as data processing system 502 in FIG. 5.

The process begins by initializing a breach counter (step 1200). The breach counter is used to track how often a failure to follow a policy for availability of a system occurs. Next, work units processed over a period of time are identified (step 1202). A determination is then made as to whether the number of work units processed is less than a threshold (step 1204). If the number of work units processed is less than the threshold, then the breach counter is incremented (step 1206).

Thereafter, a determination is made is to whether the breach counter is greater than a threshold for a number of allowable breaches (step 1208). This determination is used to allow a owner of a subsidized computer an opportunity to comply with the policy. If the breach counter is greater than the threshold, then a disable mechanism is initiated (step 1210) with the process terminating thereafter.

Turning back to step 1208, if the breach counter is not greater than the threshold, a warning is presented to the user (step 1212). This warning may take the form of a pop-up message or e-mail message that informs the computer owner that the system has not been available to process the required number of work units over a period of time. Thereafter, the process waits for some period of time before proceeding (step 1214). The process then returns to step 1202 as described above. Turning back to step 1204, if the number of work units processed is not less than a threshold, the breach counter is set equal to zero (step 1216) with the process then returning to step 1202.

Thus, the present invention provides a method, apparatus, and computer implemented instructions for building and providing a distributed computing array. This mechanism provides benefits both to the user and the business creating the distributed computing array. The users are provided with a no cost or low cost system, while the business is relieved of the burden of providing space, power, and maintenance for the computers.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for distributed computing, the method comprising:
    executing a worker application by a processor of the data processing system for a selected period of time, wherein the worker application accepts a request and processes the request to form a result, and returns the result;
    monitoring the data processing system by a software embedded in a server or in the data processing system for compliance with a policy requiring execution of the worker application for a selected period of time and a presence of a connection to a network; and
    preventing use of the data processing system by the server or by a software in the data processing system if all aspects of the policy are unmet, including execution of the worker application for a selected period of time and a presence of a connection to a network.

2. The method of claim 1, wherein the power supply to the processor in the data processing system is cut off by the server or by the software in the data processing system to prevent use of the data processing system.

3. The method of claim 1, further comprising:
    receiving a request for the data processing system from a user; and
    initiating shipping of the data processing system to the user, wherein the data processing system includes a software for performing the executing and monitoring steps.

4. The method of claim 3 further comprising:
    adding the user to a database, wherein the database identifies all users with data processing systems containing the software.

5. The method of claim 4 further comprising:
    receiving a task;
    assigning work units for the task to at least some of the users in the database to form a set of assigned users; and
    sending the work units to the set of assigned users.

6. The method of claim 3 further comprising: billing the user a reduced price for the data processing system.

7. The method of claim 3, wherein the initiating step includes sending an electronic message to a shipping company to deliver the data processing system to the user.

8. The method of claim 1 wherein the policy is used to ensure that the data processing system is only allowed to be used if the data processing system is powered up and connected to the network.

9. A data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to execute a worker application for a selected period of time, wherein the worker application accepts a request and processes the request to form a result, and returns the result; monitor the data processing system for compliance with a policy requiring execution of the worker application for a selected period of time and a presence of a connection to a network; and prevent use of the data processing system if all aspects of the policy are unmet, including execution of the worker application for a selected period of time and a presence of a connection to a network.

10. The data processing system of claim 9, wherein the processing unit also executes the set of instructions to prevent use of the data processing system if the policy is unmet, wherein the policy is usable to ensure that the data processing system is only allowed to be used if the data processing system is powered up and connected to the network.

11. The data processing system of claim 10, wherein the power supply to a processor in the data processing system is cut off to prevent use of the data processing system.

12. A data processing system for distributed computing, the data processing system comprising:
    executing means for executing a worker application for a selected period of time, wherein the worker application accepts a request and processes the request to form a result, and returns the result;
    monitoring means for monitoring the data processing system for compliance with a policy requiring execution of the worker application for a selected period of time and a presence of a connection to a network; and
    preventing means for preventing use of the data processing system if all aspects of the policy are unmet, including execution of the worker application for a selected period of time and a presence of a connection to a network.

13. The data processing system of claim 12, wherein the power supply to a processor in the data processing system is cut off to prevent use of the data processing system.

14. The data processing system of claim 12, wherein the policy is usable to ensure that the data processing system is only allowed to be used if the data processing system is powered up and connected to the network.

15. The data processing system of claim 14 in combination with a network server, the network server comprising:
    receiving means for receiving a task;
    assigning means for assigning work units for the task to the data processing system; and
    sending means for sending the work units to the data processing system.

16. The data processing system in combination with the network server of claim 15, wherein the assigning means for assigning comprises means for assigning the work units to a plurality of data processing systems, including the data processing system, and the sending means for sending comprises sending the work units to the plurality of data processing systems, including the data processing system.

17. The data processing system in combination with the network server of claim 16, wherein each data processing system within the plurality of data processing systems is in a different location.

18. A computer program product in a computer readable, recordable-type medium for distributed computing, the computer program product comprising:
- first instructions for executing a worker application for a selected period of time, wherein the worker application accepts a request and processes the request to form a result, and returns the result;
- second instructions for monitoring the data processing system for compliance with a policy requiring execution of the worker application for a selected period of time and a presence of a connection to a network; and
- third instructions for preventing use of the data processing system if all aspects of the policy are unmet, including execution of the worker application for a selected period of time and a presence of a connection to a network.

* * * * *